C. W. BOYNTON.
Grain-Drying Kiln.

No. 8,692. Reissued May 6, 1879.

Attest:
Clarence Poole
J. E. Carpenter

Inventor:
Charles W. Boynton

N. PETERS, PHOTO-LITHOGRAPHER, WASHINGTON, D. C.

C. W. BOYNTON.
Grain-Drying Kiln.

No. 8,692. Reissued May 6, 1879.

Attest:

C. Clarence Poole

J. E. Carpenter

Inventor:

Charles W. Boynton

N. PETERS, PHOTO-LITHOGRAPHER, WASHINGTON, D. C.

UNITED STATES PATENT OFFICE.

CHARLES W. BOYNTON, OF CHICAGO, ILLINOIS.

IMPROVEMENT IN GRAIN-DRYING KILNS.

Specification forming part of Letters Patent No. 213,542, dated March 25, 1879; Reissue No. 8,692, dated May 6, 1879; application filed April 9, 1879.

*To all whom it may concern:*

Be it known that I, CHARLES W. BOYNTON, of Chicago, in the county of Cook and State of Illinois, have invented a new and useful Improvement in Grain-Drying Kilns, of which the following is a specification, reference being had to the accompanying drawings, illustrating the improvement and forming a part of this specification.

The present invention relates to an improvement in kilns for drying grain, malt, and other materials, but more especially for drying malt.

The nature of my invention consists in a hot-air flue extending into the hopper, and having a partition which divides it into two branches above the cold-air inlets, combined with a valve for cutting off the heat from either of said branches, these branches leading to separate drying floors or rooms; in combination with the above, one or more furnaces arched or otherwise covered at the top, and having small side openings through which the heat must escape in jets to commingle with the proper amount of atmospheric air before reaching the drying-floors; in a tray of peculiar construction, and, further, in details and combinations, as hereinafter more fully explained.

Figure 1:
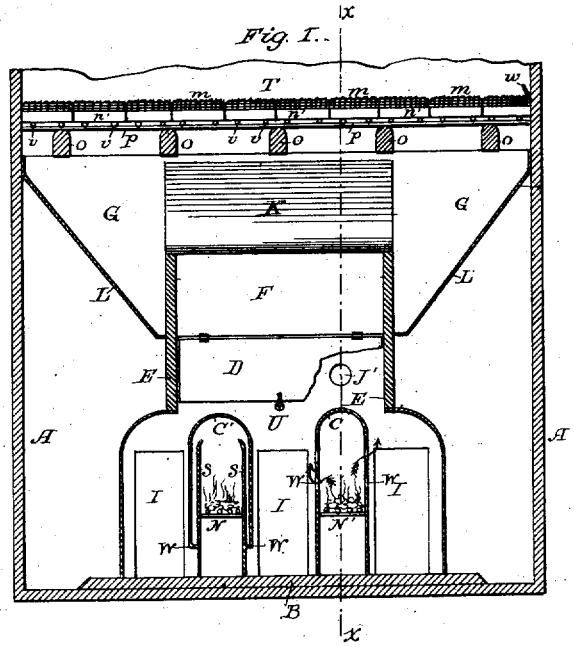
Figure 2:
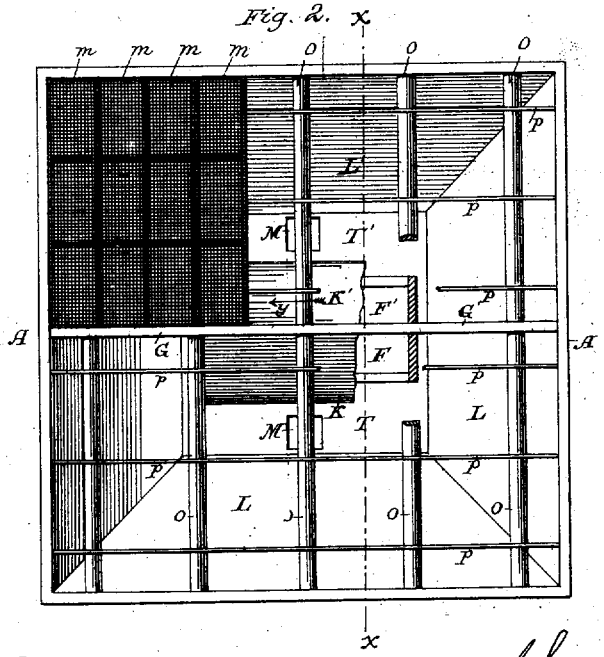
Figure 3:
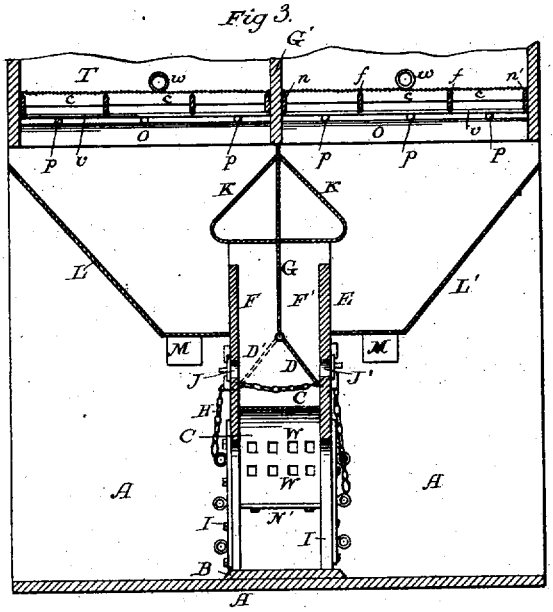
Figure 4:
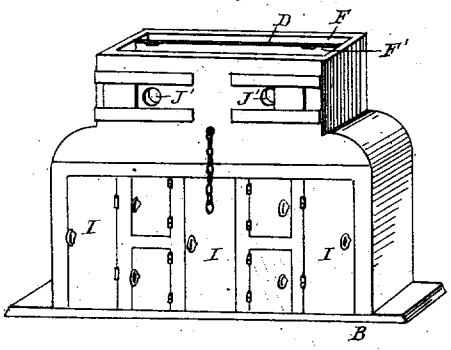
Figure 5:
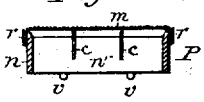
Figure 6:
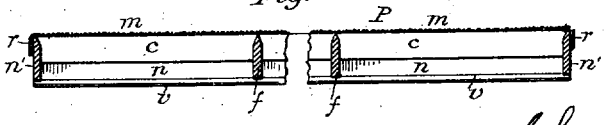

In the drawings, Figure 1 is an elevation of a drying-kiln embodying my improvements. Fig. 2 is a top or plan view of the apparatus, with the larger portion of the sectional drying-floor removed to show the construction below; Fig. 3, a sectional elevation, taken on line *x x*, viewed in the direction of dart *y*, Fig. 2; Fig. 4, a perspective view of the furnaces and case and lower parts of flues and their attached parts, all being removed from the building; Fig. 5, a transverse section of one of the trays forming the drying-floor, and Fig. 6 a broken longitudinal section of the tray.

A represents the building or exterior part of a drying-kiln inclosing my improvements. The foundation B of the furnaces is to be of any ordinary construction for that purpose. The furnace C has a semicircular dome, terminating in vertical sides, and is provided with the ordinary grate N; but, instead of having openings at the top for the escape of heat and gases, it is provided with side openings, W W, Fig. 3, for the escape of hot air and gases into an enlarged chamber, U, where they come in contact with the cold air, which tempers or properly modifies the heat as it finds its way to the grain or malt on the drying-floors. The cold air last mentioned is admitted to the interior of the enlarged chamber U by means of the doors I.

The furnace S S is provided with a hood, C′, which extends down to below the fuel on the grate N, to prevent the upward escape of heat until it has been brought in contact with a proper quantity of cold air for the purpose stated.

In some localities, and by the use of some kinds of coal, the hood C′ is required to bring the heated gases down lower than the holes W W before escaping, in order that a better supply of atmospheric air may be obtained; but under other circumstances the furnace C will answer the purpose. In any event the hot gases should escape from the sides of the furnaces in jets or thin layers into a chamber at those places, and commingle with all the atmospheric air they can take up without deadening the fire in the furnaces. This will be the guide for the operation in admitting air to them.

With this construction, anthracite coal can be used to produce combustion, and the products thereof admitted freely to the grain on the drying-floors without injuring it, and at the same time a heat is attained fully sufficient to dry all ordinary substances in a manner superior to any process now known to the art for that purpose.

The ordinary anthracite-coal furnaces eliminate the products of combustion from one open end or through a flue in the top in such a body that the atmospheric air cannot properly commingle with it. In my process I mix the maximum quantity of atmospheric air with the coal-gases, and to more effectually bring this about the air-chambers at the sides of the furnaces should be each of a width corresponding to about one-third the length of said furnaces. Chambers of smaller dimensions at the sides would operate, but experience proves that a considerable body of air is necessary to the attainment of the best results.

The hot-air flue E, as shown in the drawings, is narrower than the furnace-chamber U; but this is not material. This flue extends up between the hoppers L L′, and is covered by a deflector, K K, which protects it and prevents the grain from falling into it in its descent from the drying-rooms.

G represents a partition extending down into the flue E and dividing it above the air-inlets *j j′* into two branches, F F′. These branches extend into the hoppers L L′ of the drying-rooms. The partition G also divides the hoppers L L′ into two compartments, and it has hinged to its lower end a valve, D, for shutting off either branch of the flue when necessity requires. This valve is operated from without by a chain, by which it may be drawn to either side, or held in a vertical position, so as to leave both branches open and allow the heated air to pass on either side of it on its way to the drying-floors.

Cold air is admitted to the flue through the inlets *j j′* when it is necessary to cool the drying-rooms.

Beginning at a point just above the hopper the usual supports for the floors are laid, and a partition, G′, is extended from the partition G to the top of the drying-rooms, which rooms may have any number of floors, one above the other, thus making two distinct compartments.

My improved tray P consists of a rectangular frame braced by substantial transverse bearers *f f*, into which are gained thin metallic strips *c c*, and over the whole is stretched a wire-cloth, *m*, or other suitable material, which is bound around the outside of the frame. On the under side I attach longitudinal rods *v v*, which, besides serving as additional braces, are bearers for the tray to rest upon, and render the tipping thereof in the operation of dumping much easier than if it rested on the ribs *p*; in other words, they form pivots for the tray to turn upon in the first stage of the act of dumping.

The drying-floors are made up of a series of these trays laid side by side and extending from one side to the other of the room.

Operation: The heated air and gases passing from furnaces C in small jets are mingled with the atmospheric air in the chamber U, and this mixture is carried up through the branches F F′ into the hopper, and thence to the drying-floors.

When a lot of material has been thoroughly dried in one room—T′, for instance—the valve D is turned, so as to shut off the heat from that side, and the cold-air inlets J′ on that side are opened. After a short time the attendant enters, dumps the material from the tray nearest the door in room T′; then, after replacing the tray, steps upon it to the next, which is dumped in a like manner until all of the material on that floor has been transferred to the hopper L′, which has suitable openings in its bottom for delivering the finished material. In this manner the drying process may be carried on in one room or the other continuously.

By my construction I am enabled to use very fine wire, which is not liable to become sufficiently heated to scorch the material.

The meshes of the wire should decrease in size on each sub-floor, as the grain or malt shrinks in drying.

It is generally desirable to dump the contents of an upper floor to a lower floor, and thus utilize the heat of two or more sets of floors as the process of drying advances.

Having fully described my invention, what I claim as new, and desire to secure by Letters Patent, is—

1. In a drying-kiln, the combination, with a divided hopper, of a furnace and a divided flue leading from said furnace and extending up into said hopper, and means for deflecting the heated air or gases into either or both of said hoppers, substantially as set forth.

2. In a drying-kiln, the combination of the main flue, having branches F F′, with the valve D and hopper L L′, as set forth.

3. In a drying-kiln, the combination, with a divided hopper and a divided flue leading to the same from the heating-furnace, of a valve in the flue and cold-air inlets, located in the flue above the valve, substantially as set forth.

4. In a drying-kiln, the combination, with independent hoppers and independent flues extending into said hoppers, of heating-furnaces constructed to discharge heated air and gases laterally into a cold-air space or conduit opening into said flues, substantially as set forth.

5. In a drying-kiln, the combination, with the independent hoppers and drying-floors provided with sectional and removable trays, of one or more heating-furnaces, and flues extending therefrom and into said hoppers, whereby heated air or gases may be admitted to either or both of said hoppers, as set forth.

6. The trays P, having bearers *f f* in one direction, and other bearers, *c c*, gained into them at right angles in a frame which is covered with wire-cloth or other suitable material, the said frame having bearers *v v* on its under side, as described.

CHARLES W. BOYNTON.

Witnesses:
S. S. STOUT,
C. J. HEDRICK.